United States Patent
Peng et al.

(10) Patent No.: US 10,114,432 B2
(45) Date of Patent: Oct. 30, 2018

(54) THERMAL CONTROL SYSTEM AND THERMAL CONTROL METHOD FOR ELECTRONIC DEVICE

(71) Applicant: MEDIATEK INC., Hsin-Chu (TW)

(72) Inventors: Mark Shane Peng, Hsinchu County (TW); Lee-Kee Yong, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 774 days.

(21) Appl. No.: 14/583,817

(22) Filed: Dec. 29, 2014

(65) Prior Publication Data
US 2016/0187897 A1    Jun. 30, 2016

(51) Int. Cl.
G05D 23/19 (2006.01)
G06F 1/20 (2006.01)

(52) U.S. Cl.
CPC .......... G06F 1/206 (2013.01); G05D 23/1919 (2013.01)

(58) Field of Classification Search
None
See application file for complete search history.

(56) References Cited

U.S. PATENT DOCUMENTS

| | | | |
|---|---|---|---|
| 7,515,996 B2 * | 4/2009 | Wald | G06F 1/206 700/300 |
| 9,158,345 B1 * | 10/2015 | Rice | G06F 1/184 |
| 2015/0277395 A1 * | 10/2015 | Raman | G05B 11/42 700/299 |

* cited by examiner

Primary Examiner — Ryan A Jarrett
(74) Attorney, Agent, or Firm — Winston Hsu

(57) ABSTRACT

The present invention provides a thermal control system and a thermal control method for an electronic device. The thermal control system comprises: an integrated circuit, a determining unit, an adding unit, and a proportional-integral-derivative (PID) controlling unit. The determining unit is utilized for determining at least a target thermal parameter for the integrated circuit. The adding unit is coupled to the integrated circuit and the determining unit, and utilized for receiving the target thermal parameter and at least an actual thermal parameter of the integrated circuit to generate at least an error thermal parameter accordingly. The PID controlling unit is coupled to the adding unit and the integrated circuit, and utilized for generating at least a performance level for the integrated circuit according to the error thermal parameter.

20 Claims, 7 Drawing Sheets

THERMAL CONTROL SYSTEM AND THERMAL CONTROL METHOD FOR ELECTRONIC DEVICE

BACKGROUND

The disclosed embodiments of the present invention relate to a thermal control system and a thermal control method, and more particularly, to a thermal control system and a thermal control method have advantages of temperature targeting with proactive decisions, and capable of maximizing performance of electronic devices under the thermal envelope and target.

In general, the conventional thermal control method for various electronic devices, such as smart TVs, smartphones, tablets, or handheld computing devices use a reactive and discontinuous control mechanism (i.e. activated at a certain temperature and deactivated at another temperature). Response time of the conventional thermal control system is slower than thermal response time, and power lookup table is often inaccurate in many circumstances. The conventional thermal control system has inaccurate thermal parameters which vary from part to part of the same product model (such as power to heat coefficient, thermal time constant, etc.). The conventional thermal control method (such as a throttling method) heavily impacts performance of a central processing unit (CPU) or/and a graphics processing unit of mentioned electronic device. Please refer to FIG. 1. FIG. 1 is a timing diagram illustrating a conventional thermal control system for a smartphone as an example. As shown in FIG. 1, although the temperature of the CPU is lower than 85° C., the operating frequency F of the CPU is lower than the maximum operating frequency Fmax of the CPU. In addition, the smartphone scores only 34630 points during a performance test (Antutu performance test) by using the conventional thermal control system. Thus, how to maximize performance of the central processing unit (CPU) of the smartphone under the thermal envelope and target is an urgent problem remain to be solved.

SUMMARY

In accordance with exemplary embodiments of the present invention, a thermal control system and a thermal control method have advantages of temperature targeting with proactive decisions, and capable of maximizing performance of electronic devices under the thermal envelope and target are proposed to solve the above-mentioned problem.

According to a first aspect of the present invention, an exemplary thermal control system for an electronic device is disclosed. The exemplary thermal control system comprises: an integrated circuit, a determining unit, an adding unit, and a proportional-integral-derivative (PID) controlling unit. The determining unit is utilized for determining at least a target thermal parameter for the integrated circuit. The adding unit is coupled to the integrated circuit and the determining unit, and utilized for receiving the target thermal parameter and at least an actual thermal parameter of the integrated circuit to generate at least an error thermal parameter accordingly. The PID controlling unit is coupled to the adding unit and the integrated circuit, and utilized for generating at least a performance level for the integrated circuit according to the error thermal parameter.

According to a second aspect of the present invention, an exemplary thermal control method for an electronic device comprising an integrated circuit is disclosed. The exemplary thermal control method comprises: determining at least a target thermal parameter for the integrated circuit; utilizing an adding unit for receiving the target thermal parameter and at least an actual thermal parameter of the integrated circuit to generate at least an error thermal parameter accordingly; and utilizing a PID controlling unit for generating at least a performance level for the integrated circuit according to the error thermal parameter.

According to a third aspect of the present invention, an exemplary thermal control system for an electronic device is disclosed. The exemplary thermal control system comprises: an integrated circuit, a determining unit, a first adding unit, a first PID controlling unit, a second adding unit, and a second PID controlling unit. The determining unit is utilized for determining at least a first target thermal parameter for the integrated circuit. The first adding unit is coupled to the integrated circuit and the determining unit, and utilized for receiving the first target thermal parameter and at least a first actual thermal parameter of the integrated circuit to generate at least a first error thermal parameter accordingly. The first PID controlling unit is coupled to the first adding unit, and utilized for generating at least a second target thermal parameter according to the first error thermal parameter. The second adding unit is coupled to the integrated circuit and the first PID controlling unit, and utilized for receiving the second target thermal parameter and at least a second actual thermal parameter of the integrated circuit to generate at least a second error thermal parameter accordingly. The second PID controlling unit is coupled to the second adding unit and the integrated circuit, and utilized for generating at least a performance level for the integrated circuit according to the second error thermal parameter.

According to a fourth aspect of the present invention, an exemplary thermal control method for an electronic device comprising an integrated circuit is disclosed. The exemplary thermal control method comprises: determining at least a first target thermal parameter for the integrated circuit; utilizing a first adding unit for receiving the first target thermal parameter and at least a first actual thermal parameter of the integrated circuit to generate at least a first error thermal parameter accordingly; utilizing a first PID controlling unit for generating at least a second target thermal parameter according to the first error thermal parameter; utilizing a second adding unit for receiving the second target thermal parameter and at least a second actual thermal parameter of the integrated circuit to generate at least a second error thermal parameter accordingly; and utilizing a second PID controlling unit for generating at least a performance level for the integrated circuit according to the second error thermal parameter.

Briefly summarized, the thermal control system and the thermal control method disclosed by the present invention have advantages of temperature targeting with proactive decisions, and can maximize performance of the electronic device under the thermal envelope and target. The equilibrium points can be automatically found by the feedback loop in the present invention, and it is per electronic device (such as different smart TVs, smartphones, tablets, or handheld computing devices) adaptation, per operation system (such as iOS or Android OS) adaptation, and per IC adaptation. In addition, the PID controlling unit 540 is simple, robust, and can handles non-linearities, time dependent variations, and poorly modeled systems.

These and other objectives of the embodiments in present invention will no doubt become obvious to those of ordinary skill in the art after reading the following detailed description of the embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The key idea of the present invention is to use a negative feedback loop based on the control theory to adjust the operating point of the central processing unit (CPU) or/and graphics processing unit (GPU) in real-time to achieve maximal CPU performance or/and GPU performance under a thermal envelope and target. Further details of the proposed constellation phase rotation scheme are described as below.

Figure 2:
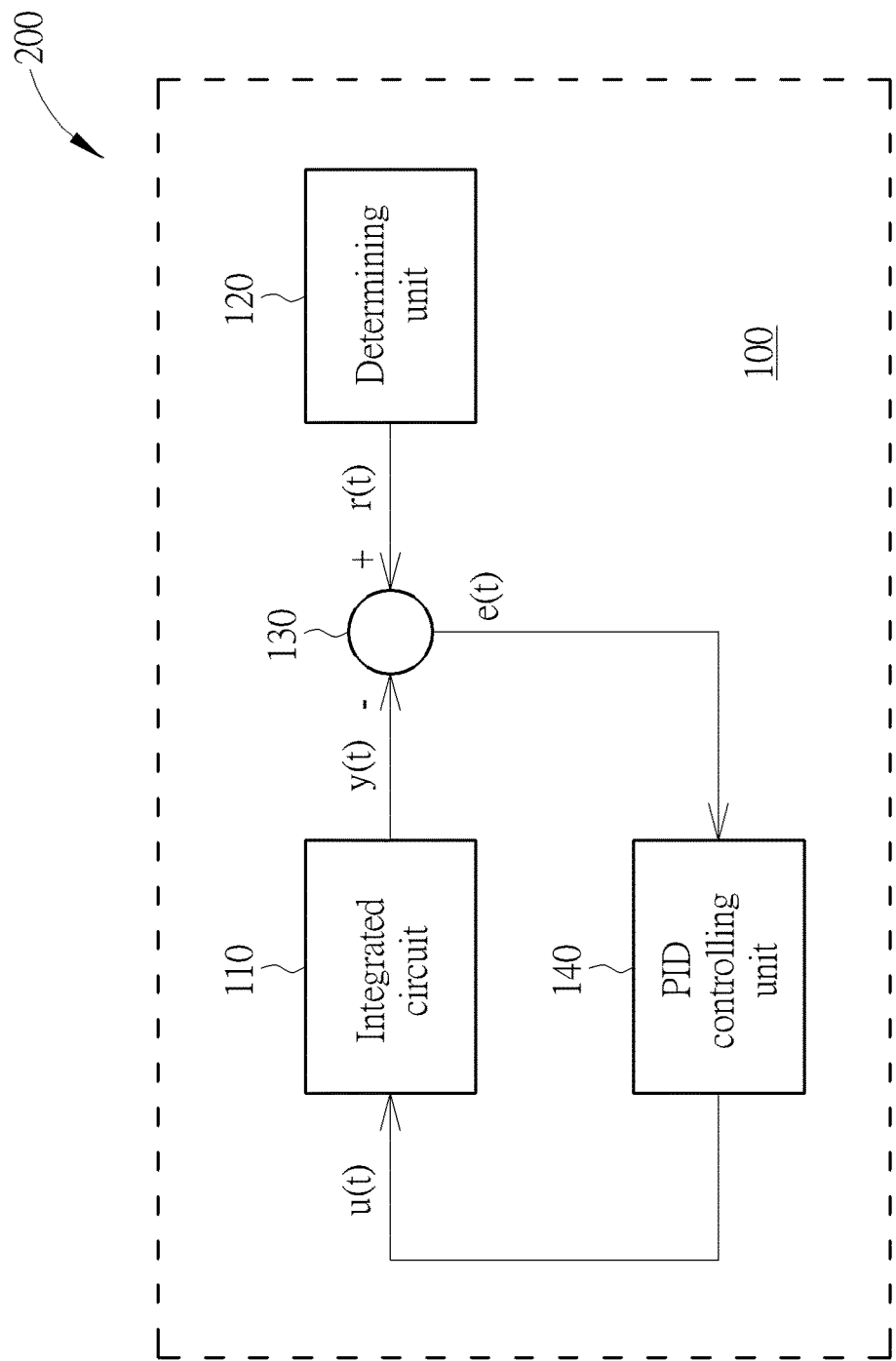
FIG. 2 is a simplified diagram of a thermal control system for an electronic device according to a first exemplary embodiment of the present invention.

Please refer to FIG. 2. FIG. 2 is a simplified diagram of a thermal control system 100 for an electronic device 200 according to a first exemplary embodiment of the present invention, wherein the electronic device 200 can be a smart TV, a smartphone, a tablet, or a handheld computing device and not limited. As shown in FIG. 2, the thermal control system 100 comprises: an integrated circuit 110, a determining unit 120, an adding unit 130, and a proportional-integral-derivative (PID) controlling unit 140, wherein the integrated circuit 110 can be a CPU or GPU of the electronic device.

The determining unit 120 is utilized for determining a target thermal parameter r(t) for the integrated circuit 110. The adding unit 130 is coupled to the integrated circuit 110 and the determining unit 120, and utilized for receiving the target thermal parameter (t) and an actual thermal parameter y(t) of the integrated circuit 110 to generate an error thermal parameter e(t) accordingly, wherein e(t)=r(t)−y(t). The PID controlling unit 140 is coupled to the adding unit 130 and the integrated circuit 110, and utilized for generating a performance level u(t) for the integrated circuit 110 according to the error thermal parameter e(t) wherein u (t)=$K_p\{e(t)\}$+$K_i\{\int e(\tau)d\tau\}$+$K_d\{de(t)/dt\}$, and $K_p\{e(t)\}$ is a proportional part (i.e. a present term or an absolute error reaction), and $K_i\{\int e(\tau)d\tau\}$ is an integral part (i.e. a long term or a slow error reaction), and $K_d\{de(t)/dt\}$ is a derivative part (i.e. a short term or a fast error reaction), and $K_p$ is a proportional gain (i.e. a tuning parameter), and $K_i$ is an integral gain (i.e. a tuning parameter), and $K_d$ is a derivative gain (i.e. a tuning parameter), and t is time or instantaneous time (i.e. the present), and $\tau$ is a variable of integration which takes on values from time 0 to the present t.

Figure 1:
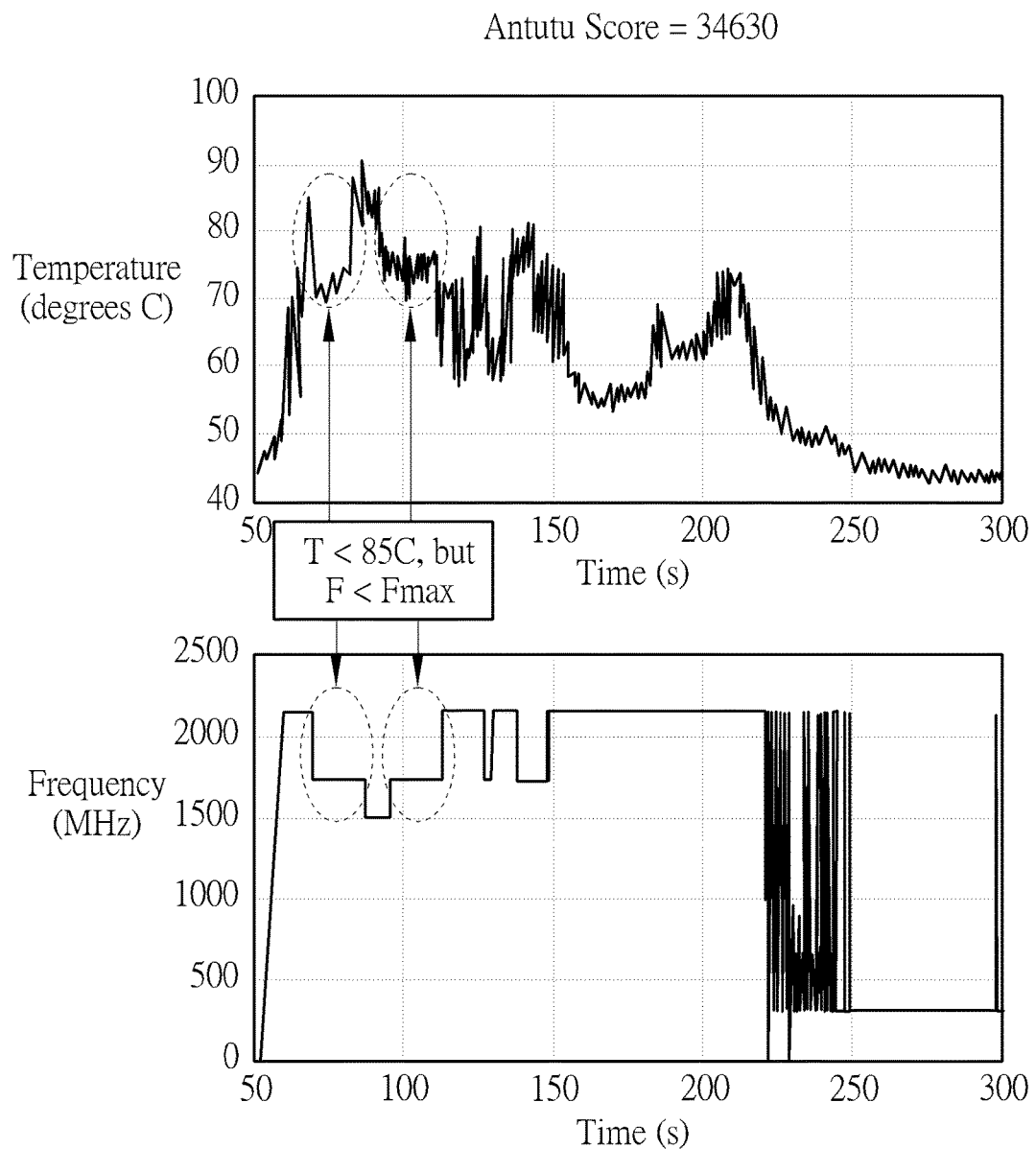
FIG. 1 is a timing diagram illustrating a conventional thermal control system for a smartphone.
Figure 3:
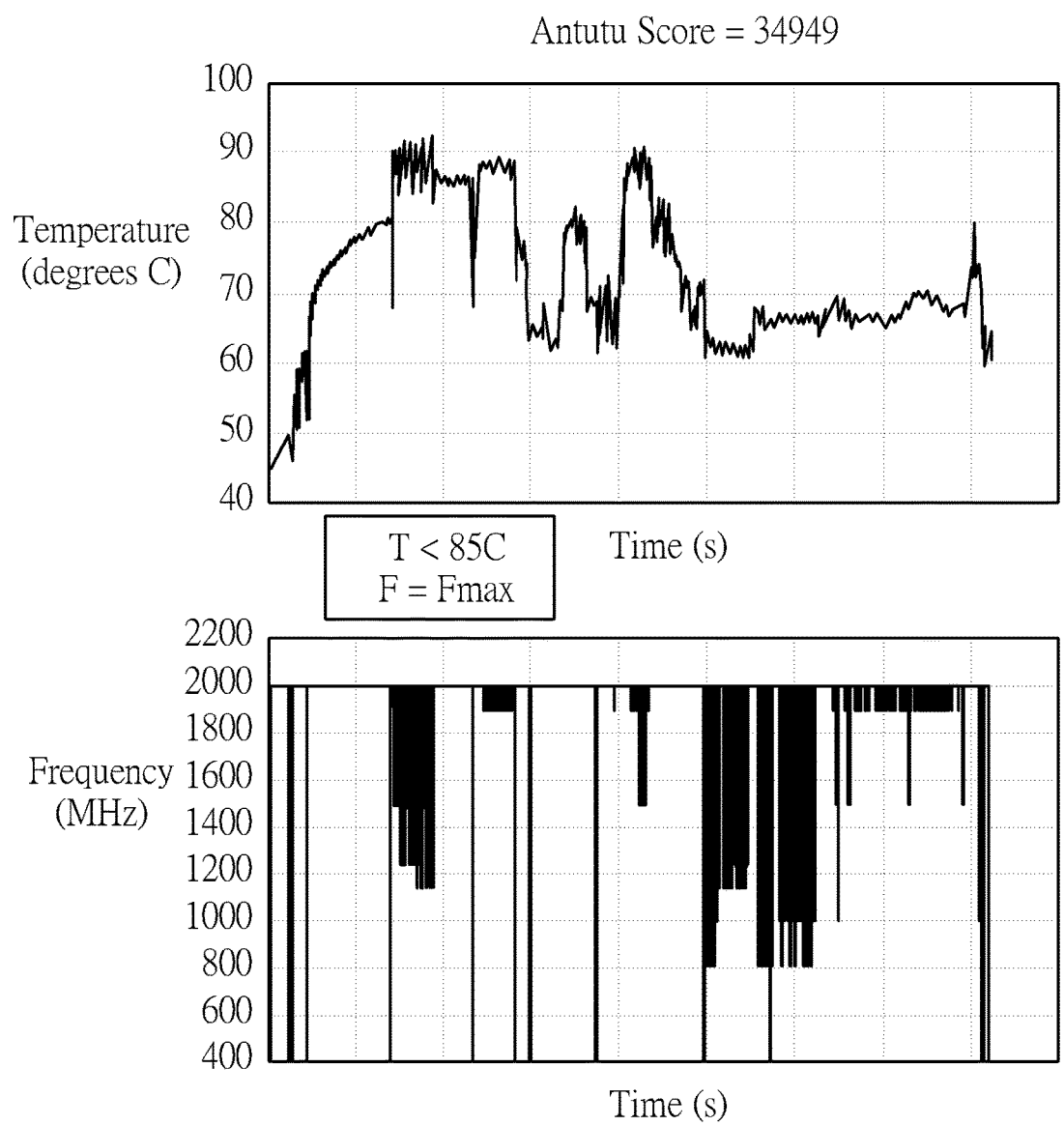
FIG. 3 is a timing diagram illustrating an exemplary embodiment of the thermal control process performed by the thermal control system for the electronic device in FIG. 2.

The integrated circuit 110, the adding unit 130, and the PID controlling unit 140 operate in a feedback loop, and the actual thermal parameter y(t) of the integrated circuit 110 will be adjusted according to the performance level u(t). By way of example, but not limitation, when the electronic device 200 comprises a CPU, a GPU, a battery, and/or an electronic device case, the target thermal parameter r(t) can be a temperature of the CPU, a temperature of the GPU, a temperature of the battery, or a temperature of the electronic device case, and the actual thermal parameter y(t) can be a temperature of the CPU, a temperature of the GPU, a temperature of the battery, or a temperature of the electronic device case, and the error thermal parameter e(t) can be a temperature of the CPU, a temperature of the GPU, a temperature of the battery, or a temperature of the electronic device case, and the performance level u(t) can be a current dynamic voltage frequency scaling (DVFS) point of the CPU, a current operating frequency of the CPU, a current DVFS limit of the GPU, a current voltage supply level of the GPU, or a usable number the CPU cores. By way of example, but not limitation, if the target thermal parameter r(t) is a temperature of the CPU of 85° C. and the actual thermal parameter y(t) is a temperature of the CPU of 70° C., then the error thermal parameter e(t) is 15° C. and the PID controlling unit 140 will generate a performance level u(t) of current operating frequency of the CPU of 2000 MHz (i.e. the operating frequency F of the CPU is equal to the maximum operating frequency Fmax of the CPU) according to the error thermal parameter e(t) (15° C.). In this way, the CPU performance can be maximized. Please refer to FIG. 3, FIG. 3 is a timing diagram illustrating an exemplary embodiment of the thermal control process performed by the thermal control system 100 for the electronic device 200 in FIG. 2. As shown in FIG. 3, when the actual thermal parameter y(t) (i.e. the temperature of the CPU) is lower than the target thermal parameter r(t) (i.e. the temperature of the CPU), the performance level u(t) (i.e. the current operating frequency of the CPU) can be maximized (i.e. 2000 MHz). In addition, by using the thermal control system 200, the smartphone has Antutu score of 36949 which is obviously higher than that of the prior art in FIG. 1. Thus, in comparison with the prior art in FIG. 1, the thermal control system 200 disclosed by the present invention has advantages of temperature targeting with proactive decisions, and can maximize performance under the thermal envelope and target. The equilibrium points can be automatically found by the feedback loop in the present invention, and it is per electronic device (such as different smart TVs, smartphones, tablets, or handheld computing devices) adaptation, per operation system (such as iOS or Android OS) adaptation, and per IC adaptation. In addition, the PID controlling unit 140 is simple, robust, and can handles non-linearities, time dependent variations, and poorly modeled systems. The present invention can selectively turn on/off the PID controlling unit 140 based on modes/criteria such as power. For example, the PID controlling unit 140 is turned on when the CPU loading is heavy, and the PID controlling unit 140 is turned off when the smartphone in deep idle to save power. Please note that the above embodiment is only for an illustrative purpose and is not meant to be a limitation of the present invention.

Figure 4:
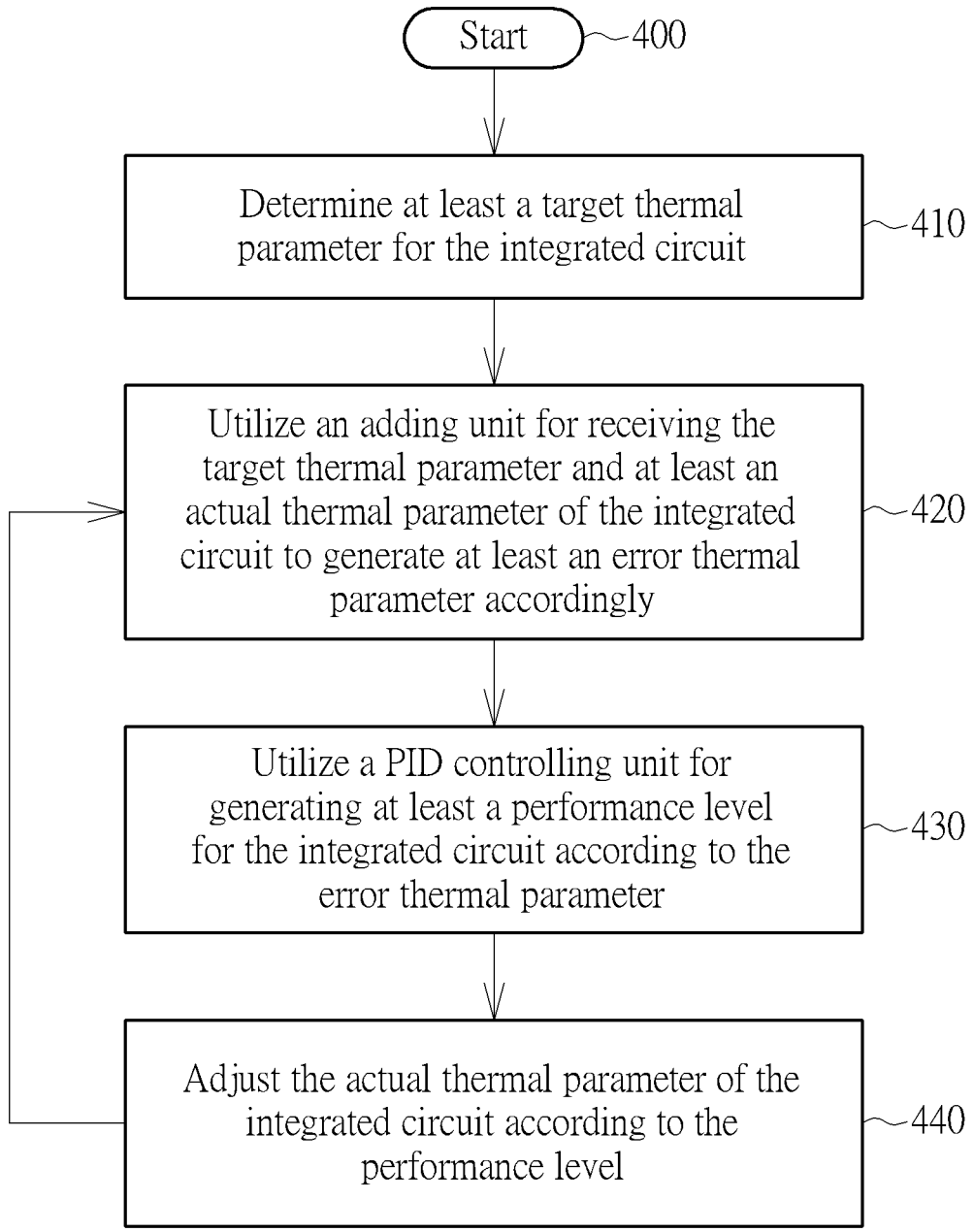
FIG. 4 is a flowchart showing a thermal control method in accordance with the operation schemes of the thermal control system for the electronic device in FIG. 2.

Please refer to FIG. 4. FIG. 4 is a flowchart showing a thermal control method in accordance with the operation schemes of the thermal control system 100 for the electronic device 200 in the above embodiment. Provided that the result is substantially the same, the steps in FIG. 4 are not required to be executed in the exact order shown in FIG. 4. The thermal control method in accordance with the above embodiment of the thermal control system 100 in the present invention comprises the following steps:

Step 400: Start.

Step 410: Determine at least a target thermal parameter for the integrated circuit.

Step 420: Utilize an adding unit for receiving the target thermal parameter and at least an actual thermal parameter of the integrated circuit to generate at least an error thermal parameter accordingly.

Step 430: Utilize a PID controlling unit for generating at least a performance level for the integrated circuit according to the error thermal parameter.

Step 440: Adjust the actual thermal parameter of the integrated circuit according to the performance level.

Please note that the above embodiment is only for an illustrative purpose and is not meant to be a limitation of the present invention. For example, the number of the adding unit and the PID controlling unit can be changed according to different design requirements.

Figure 5:
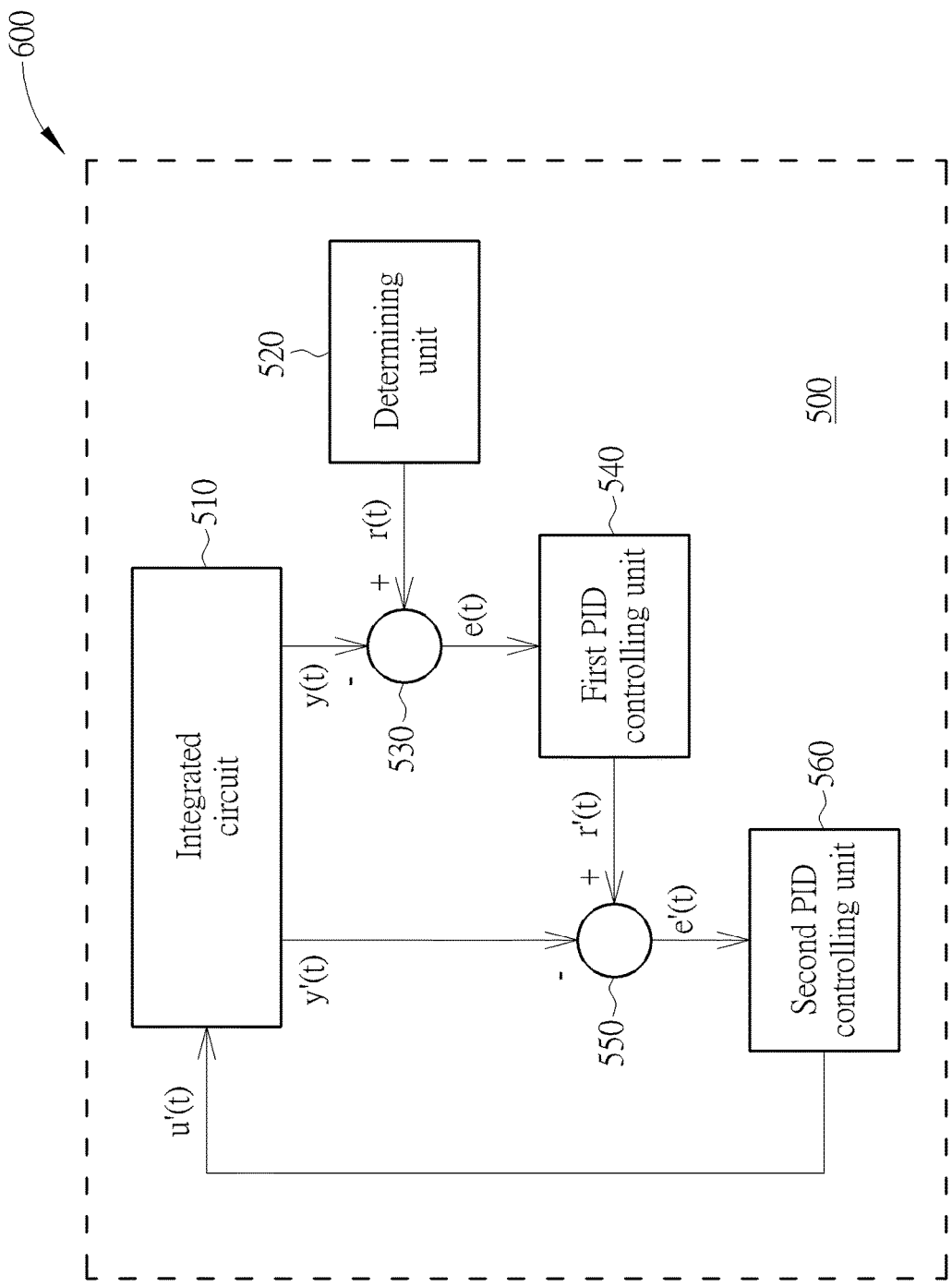
FIG. 5 is a simplified diagram of a thermal control system for an electronic device according to a second exemplary embodiment of the present invention.

Please refer to FIG. 5. FIG. 5 is a simplified diagram of a thermal control system 500 for an electronic device 600 according to a second exemplary embodiment of the present invention, wherein the electronic device 600 can be a smart TV, a smartphone, a tablet, or a handheld computing device. As shown in FIG. 2, the thermal control system 500 comprises: an integrated circuit 510, a determining unit 520, a first adding unit 530, and a first PID controlling unit 540, a second adding unit 550, and a second PID controlling unit 560, wherein the integrated circuit 510 can be a CPU or GPU of the electronic device 600.

The determining unit 520 is utilized for determining a first target thermal parameter r(t) for the integrated circuit 510. The first adding unit 530 is coupled to the integrated circuit 510 and the determining unit 520, and utilized for receiving the first target thermal parameter r(t) and a first actual thermal parameter y(t) of the integrated circuit 510 to generate a first error thermal parameter e(t) accordingly, wherein e(t)=r(t)−y(t). The first PID controlling unit 540 is coupled to the adding unit 530, and utilized for generating a second target thermal parameter r'(t) for the integrated circuit 510 according to the first error thermal parameter e(t), wherein $r'(t)=K_p\{e(t)\}+K_i\{\int e(\tau)d\tau\}+K_d\{de(t)/dt\}$, and $K_p\{e(t)\}$ is a proportional part (i.e. a present term or an absolute error reaction), and $K_i\{\int e(\tau)d\tau\}$ is an integral part (i.e. a long term or a slow error reaction), and $K_d\{de(t)/dt\}$ is a derivative part (i.e. a short term or a fast error reaction), and $K_p$ is a proportional gain (i.e. a tuning parameter), and $K_i$ is an integral gain (i.e. a tuning parameter), and $K_d$ is a derivative gain (i.e. a tuning parameter), and t is time or instantaneous time (i.e. the present), and $\tau$ is a variable of integration which takes on values from time 0 to the present t. The second adding unit 550 is coupled to the integrated circuit 510 and the determining unit 520, and utilized for receiving the second target thermal parameter r'(t) and a second actual thermal parameter y'(t) of the integrated circuit 510 to generate a second error thermal parameter e'(t) accordingly, wherein e'(t)=r'(t)−y'(t). The second PID controlling unit 560 is coupled to the second adding unit 550 and the integrated circuit 510, and utilized for generating a performance level u(t) for the integrated circuit 510 according to the second error thermal parameter e'(t), wherein $u(t)=K'_p\{e'(t)\}+K'_i\{\int e'(\tau)d\tau\}+K'_d\{de'(t)/dt\}$, and $K'_p\{e'(t)\}$ is a proportional part (i.e. a present term or an absolute error reaction), and $K'_i\{\int e'(\tau)d\tau\}$ is an integral part (i.e. a long term or a slow error reaction), and $K'_d\{de'(t)/dt\}$ is a derivative part (i.e. a short term or a fast error reaction), and $K'_p$ is a proportional gain (i.e. a tuning parameter), and $K'_i$ is an integral gain (i.e. a tuning parameter), and $K'_d$ is a derivative gain (i.e. a tuning parameter), and t is time or instantaneous time (i.e. the present), and $\tau$ is a variable of integration which takes on values from time 0 to the present t.

The integrated circuit 510, the first adding unit 530, and the first PID controlling unit 540, the second adding unit 550, and the second PID controlling unit 560 operate in a feedback loop, and the first actual thermal parameter y(t) and the second actual thermal parameter y'(t) of the integrated circuit 510 will be adjusted according to the performance level u(t). By way of example, but not limitation, when the electronic device 600 comprises a CPU, a GPU, a battery, and an electronic device case, the first target thermal parameter r(t) can be a temperature of the battery or a temperature of the electronic device case, and the second target thermal parameter r'(t) can be a temperature of the CPU or a temperature of the GPU, and the first actual thermal parameter y(t) can be a temperature of the battery or a temperature of the electronic device case, and the second actual thermal parameter y'(t) can be a temperature of the CPU or a temperature of the GPU, and the first error thermal parameter e(t) can be a temperature of the battery or a temperature of the electronic device case, and the second error thermal parameter e'(t) can be a temperature of the CPU or a temperature of the GPU. The performance level u(t) can be a current dynamic voltage frequency scaling (DVFS) point of the CPU, a current operating frequency of the CPU, a current DVFS limit of the GPU, a current voltage supply level of the GPU, or a usable number the CPU cores. By way of example, but not limitation, if the first target thermal parameter r(t) is a temperature of the electronic device case of 40° C. and the first actual thermal parameter y(t) is a temperature of the electronic device case of 30° C., then the first error thermal parameter e(t) is 10° C. and the first PID controlling unit 540 will generate a second target thermal parameter r'(t) of a temperature of the CPU of 85° C. according to the first error thermal parameter e(t) (10° C.). If the second actual thermal parameter y'(t) is a temperature of the CPU of 70° C., then the second error thermal parameter e'(t) is 15° C. and the second PID controlling unit 560 will generate a performance level u(t) of current operating frequency of the CPU of 2000 MHz (i.e. the operating frequency F of the CPU is equal to the maximum operating frequency Fmax of the CPU) according to the error thermal parameter e(t) (15° C.). In this way, the multiple thermal parameters and/or multiple performance levels can be combined to maximized the CPU/GPU performance, and the multiple thermal parameters can be optimized/controlled simultaneously with multiple loops (nested or otherwise). In addition, in comparison with the prior art in FIG. 1, the thermal control system 500 disclosed by the present invention has advantages of temperature targeting with proactive decisions, and can maximize performance under the thermal envelope and target. The equilibrium points can be automatically found by the feedback loop in the present invention, and it is per electronic device (such as different smart TVs, smartphones, tablets, or handheld computing devices) adaptation, per operation system (such as iOS or Android OS) adaptation, and per IC adaptation. In addition, the PID controlling unit 540 is simple, robust, and can handles non-linearities, time dependent variations, and poorly modeled systems. The present invention can selectively turn on/off the PID controlling unit 540 based on modes/criteria such as power. For example, the PID controlling unit 540 is turned on when the CPU loading is heavy, and the PID controlling unit 540 is turned off when the smartphone in deep idle to save power. Please note that the above embodiment is only for an illustrative purpose and is not meant to be a limitation of the present invention.

Figure 6:
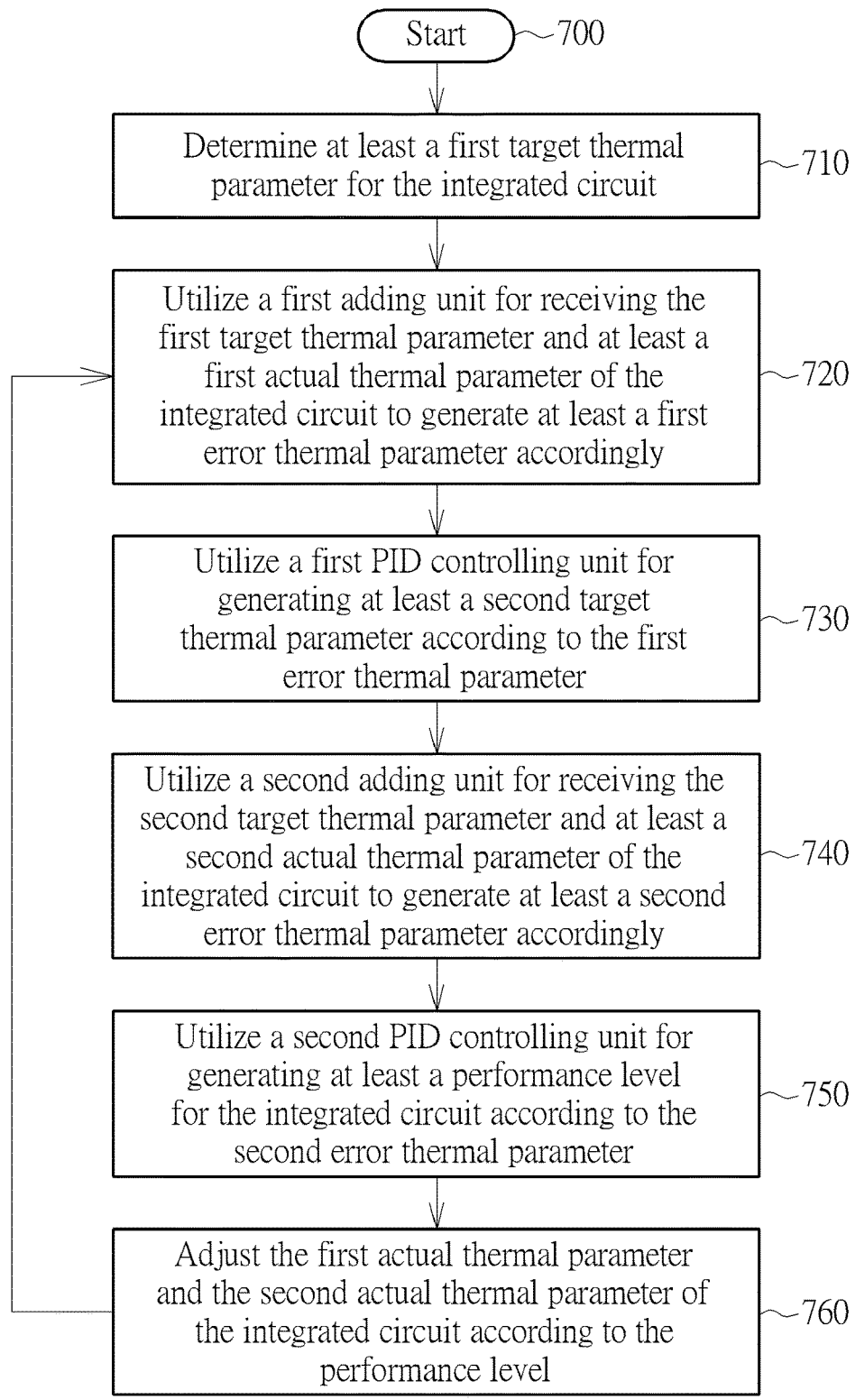
FIG. 6 is a flowchart showing a thermal control method in accordance with the operation schemes of the thermal control system for the electronic device in FIG. 5.

Please refer to FIG. 6. FIG. 6 is a flowchart showing a thermal control method in accordance with the operation schemes of the thermal control system 500 for the electronic device 600 in the above embodiment. Provided that the result is substantially the same, the steps in FIG. 6 are not required to be executed in the exact order shown in FIG. 4. The thermal control method in accordance with the above embodiment of the thermal control system 500 in the present invention comprises the following steps:

Step 700: Start.

Step 710: Determine at least a first target thermal parameter for the integrated circuit.

Step 720: Utilize a first adding unit for receiving the first target thermal parameter and at least a first actual thermal parameter of the integrated circuit to generate at least a first error thermal parameter accordingly.

Step 730: Utilize a first PID controlling unit for generating at least a second target thermal parameter according to the first error thermal parameter.

Step 740: Utilize a second adding unit for receiving the second target thermal parameter and at least a second actual thermal parameter of the integrated circuit to generate at least a second error thermal parameter accordingly.

Step 750: Utilize a second PID controlling unit for generating at least a performance level for the integrated circuit according to the second error thermal parameter.

Step 760: Adjust the first actual thermal parameter and the second actual thermal parameter of the integrated circuit according to the performance level.

Please note that the above embodiment is only for an illustrative purpose and is not meant to be a limitation of the present invention. For example, the number of the adding unit and the PID controlling unit can be changed according to different design requirements.

Figure 7:
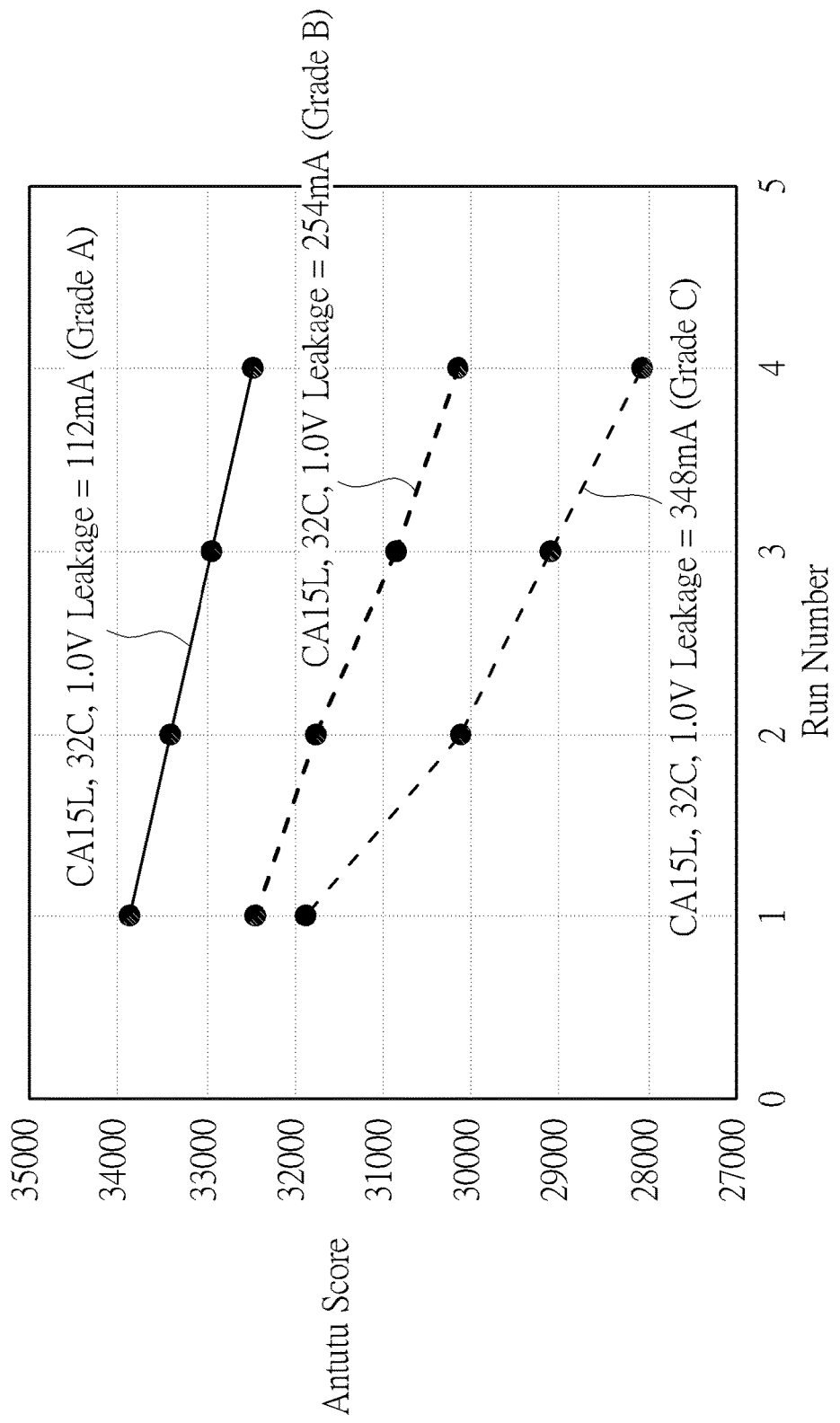
FIG. 7 is a simplified diagram showing that the PID controlling unit of the present invention performs consecutive Antutu runs on smartphones of Grade A, B, and C, which shows robustness of the PID controlling unit of the present invention.

Briefly summarized, the thermal control system and the thermal control method disclosed by the present invention have advantages of temperature targeting with proactive decisions, and can maximize performance of the electronic device under the thermal envelope and target. The equilibrium points can be automatically found by the feedback loop in the present invention, and it is per electronic device (such as different smart TVs, smartphones, tablets, or handheld computing devices) adaptation, per operation system (such as iOS or Android OS) adaptation, and per IC adaptation. In addition, the PID controlling unit 540 is simple, robust, and can handles non-linearities, time dependent variations, and poorly modeled systems. For example, please refer to FIG. 7. FIG. 7 is a simplified diagram showing that the PID controlling unit 540 performs consecutive Antutu runs on smartphones of Grade A, B, and C, which shows robustness of the PID controlling unit 540 of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thermal control system for an electronic device, comprising:
    an integrated circuit;
    a determining unit, for determining at least a first target thermal parameter for the integrated circuit;
    a first adding unit, coupled to the integrated circuit and the determining unit, for receiving the first target thermal parameter and at least a first actual thermal parameter of the integrated circuit to generate at least a first error thermal parameter accordingly;
    a first proportional-integral-derivative (PID) controlling unit, coupled to the first adding unit, for generating at least a second target thermal parameter according to the first error thermal parameter;
    a second adding unit, coupled to the integrated circuit and the first PID controlling unit, for receiving the second target thermal parameter and at least a second actual thermal parameter of the integrated circuit to generate at least a second error thermal parameter accordingly; and
    a second PID controlling unit, coupled to the second adding unit and the integrated circuit, for generating at least a performance level for the integrated circuit according to the second error thermal parameter;
    wherein the electronic device comprises a central processing unit (CPU), a graphics processing unit (GPU), a battery, or an electronic device case, and the first target thermal parameter is a target temperature of the battery or a target temperature of the electronic device case, and the second target thermal parameter is a target temperature of the CPU or a target temperature of the GPU.

2. The thermal control system of claim 1, wherein the integrated circuit, the first adding unit, the first PID controlling unit, the second adding unit, and the second PID controlling unit operate in a feedback loop, and the first actual thermal parameter and the second actual thermal parameter of the integrated circuit are adjusted according to the performance level in a previous loop.

3. The thermal control system of claim 1, wherein the integrated circuit is the CPU or the GPU of the electronic device.

4. The thermal control system of claim 1, wherein the first actual thermal parameter is an actual temperature of the battery or an actual temperature of the electronic device case in a current loop, wherein the second actual thermal parameter is an actual temperature of the CPU or an actual temperature of the GPU in the current loop.

5. The thermal control system of claim 1, wherein the first error thermal parameter is a temperature variation between a target temperature and an actual temperature of the battery or a temperature variation between a target temperature and an actual temperature of the electronic device case in a current loop, wherein the second error thermal parameter is a temperature variation between a target temperature and an actual temperature of the CPU or a temperature variation between a target temperature and an actual temperature of the GPU in the current loop.

6. The thermal control system of claim 1, wherein the performance level is a current dynamic voltage frequency scaling (DVFS) point of the CPU, a current operating frequency of the CPU, a current DVFS limit of the GPU, a current voltage supply level of the GPU, or a usable number the CPU cores.

7. A thermal control method for an electronic device comprising an integrated circuit, the thermal control method comprising:
   determining at least a first target thermal parameter for the integrated circuit;
   utilizing a first adding unit for receiving the first target thermal parameter and at least a first actual thermal parameter of the integrated circuit to generate at least a first error thermal parameter accordingly;
   utilizing a first proportional-integral-derivative (PID) controlling unit for generating at least a second target thermal parameter according to the first error thermal parameter;
   utilizing a second adding unit for receiving the second target thermal parameter and at least a second actual thermal parameter of the integrated circuit to generate at least a second error thermal parameter accordingly; and
   utilizing a second PID controlling unit for generating at least a performance level for the integrated circuit according to the second error thermal parameter;
   wherein the electronic device comprises a central processing unit (CPU), a graphics processing unit (GPU), a battery, or an electronic device case, and the first target thermal parameter is a target temperature of the battery or a target temperature of the electronic device case, and the second target thermal parameter is a target temperature of the CPU or a target temperature of the GPU.

8. The thermal control method of claim 7, wherein the integrated circuit, the first adding unit, the first PID controlling unit, the second adding unit, and the second PID controlling unit operate in a feedback loop, and the thermal control method further comprises:
   adjusting the first actual thermal parameter and the second actual thermal parameter of the integrated circuit according to the performance level in a previous loop.

9. The thermal control method of claim 7, wherein the integrated circuit is the CPU or the GPU of the electronic device.

10. The thermal control method of claim 7, wherein the first actual thermal parameter is an actual temperature of the battery or an actual temperature of the electronic device case in a current loop, and the second actual thermal parameter is an actual temperature of the CPU or an actual temperature of the GPU in the current loop.

11. The thermal control method of claim 7, wherein the first error thermal parameter is a temperature variation between a target temperature and an actual temperature of the battery or a temperature variation between a target temperature and an actual temperature of the electronic device case in a current loop, wherein the second error thermal parameter is a temperature variation between a target temperature and an actual temperature of the CPU or a temperature variation between a target temperature and an actual temperature of the GPU in the current loop.

12. The thermal control method of claim 7, wherein the performance level is a current dynamic voltage frequency scaling (DVFS) point of the CPU, a current operating frequency of the CPU, a current DVFS limit of the GPU, a current voltage supply level of the GPU, or a usable number the CPU cores.

13. A thermal control system for an electronic device, comprising:
   an integrated circuit;
   a determining unit, for determining at least a first target thermal parameter for the integrated circuit;
   a first adding unit, coupled to the integrated circuit and the determining unit, for receiving the first target thermal parameter and at least a first actual thermal parameter of the integrated circuit to generate at least a first error thermal parameter accordingly;
   a first proportional-integral-derivative (PID) controlling unit, coupled to the first adding unit, for generating at least a second target thermal parameter according to the first error thermal parameter;
   a second adding unit, coupled to the integrated circuit and the first PID controlling unit, for receiving the second target thermal parameter and at least a second actual thermal parameter of the integrated circuit to generate at least a second error thermal parameter accordingly; and
   a second PID controlling unit, coupled to the second adding unit and the integrated circuit, for generating at least a performance level for the integrated circuit according to the second error thermal parameter;
   wherein the electronic device comprises a central processing unit (CPU), a graphics processing unit (GPU), a battery, or an electronic device case, and the first actual thermal parameter is an actual temperature of the battery or an actual temperature of the electronic device case in a current loop, wherein the second actual thermal parameter is an actual temperature of the CPU or an actual temperature of the GPU in the current loop.

14. The thermal control system of claim 13, wherein the first error thermal parameter is a temperature variation between a target temperature and an actual temperature of the battery or a temperature variation between a target temperature and an actual temperature of the electronic device case in a current loop, wherein the second error thermal parameter is a temperature variation between a target temperature and an actual temperature of the CPU or a temperature variation between a target temperature and an actual temperature of the GPU in the current loop.

15. A thermal control system for an electronic device, comprising:
   an integrated circuit;
   a determining unit, for determining at least a first target thermal parameter for the integrated circuit;
   a first adding unit, coupled to the integrated circuit and the determining unit, for receiving the first target thermal parameter and at least a first actual thermal parameter of the integrated circuit to generate at least a first error thermal parameter accordingly;
   a first proportional-integral-derivative (PID) controlling unit, coupled to the first adding unit, for generating at least a second target thermal parameter according to the first error thermal parameter;
   a second adding unit, coupled to the integrated circuit and the first PID controlling unit, for receiving the second target thermal parameter and at least a second actual thermal parameter of the integrated circuit to generate at least a second error thermal parameter accordingly; and
   a second PID controlling unit, coupled to the second adding unit and the integrated circuit, for generating at least a performance level for the integrated circuit according to the second error thermal parameter;

wherein the electronic device comprises a central processing unit (CPU), a graphics processing unit (GPU), a battery, or an electronic device case, and the first error thermal parameter is a temperature variation between a target temperature and an actual temperature of the battery or a temperature variation between a target temperature and an actual temperature of the electronic device case in a current loop, wherein the second error thermal parameter is a temperature variation between a target temperature and an actual temperature of the CPU or a temperature variation between a target temperature and an actual temperature of the GPU in the current loop.

16. The thermal control system of claim 15, wherein the first actual thermal parameter is an actual temperature of the battery or an actual temperature of the electronic device case in a current loop, wherein the second actual thermal parameter is an actual temperature of the CPU or an actual temperature of the GPU in the current loop.

17. A thermal control method for an electronic device comprising an integrated circuit, the thermal control method comprising:

determining at least a first target thermal parameter for the integrated circuit;

utilizing a first adding unit for receiving the first target thermal parameter and at least a first actual thermal parameter of the integrated circuit to generate at least a first error thermal parameter accordingly;

utilizing a first proportional-integral-derivative (PID) controlling unit for generating at least a second target thermal parameter according to the first error thermal parameter;

utilizing a second adding unit for receiving the second target thermal parameter and at least a second actual thermal parameter of the integrated circuit to generate at least a second error thermal parameter accordingly; and utilizing a second PID controlling unit for generating at least a performance level for the integrated circuit according to the second error thermal parameter;

wherein the electronic device comprises a central processing unit (CPU), a graphics processing unit (GPU), a battery, or an electronic device case, and the first actual thermal parameter is an actual temperature of the battery or an actual temperature of the electronic device case in a current loop, and the second actual thermal parameter is an actual temperature of the CPU or an actual temperature of the GPU in the current loop.

18. The thermal control method of claim 17, wherein the first error thermal parameter is a temperature variation between a target temperature and an actual temperature of the battery or a temperature variation between a target temperature and an actual temperature of the electronic device case in a current loop, wherein the second error thermal parameter is a temperature variation between a target temperature and an actual temperature of the CPU or a temperature variation between a target temperature and an actual temperature of the GPU in the current loop.

19. A thermal control method for an electronic device comprising an integrated circuit, the thermal control method comprising:

determining at least a first target thermal parameter for the integrated circuit;

utilizing a first adding unit for receiving the first target thermal parameter and at least a first actual thermal parameter of the integrated circuit to generate at least a first error thermal parameter accordingly;

utilizing a first proportional-integral-derivative (PID) controlling unit for generating at least a second target thermal parameter according to the first error thermal parameter;

utilizing a second adding unit for receiving the second target thermal parameter and at least a second actual thermal parameter of the integrated circuit to generate at least a second error thermal parameter accordingly; and utilizing a second PID controlling unit for generating at least a performance level for the integrated circuit according to the second error thermal parameter;

wherein the electronic device comprises a central processing unit (CPU), a graphics processing unit (GPU), a battery, or an electronic device case, and the first error thermal parameter is a temperature variation between a target temperature and an actual temperature of the battery or a temperature variation between a target temperature and an actual temperature of the electronic device case in a current loop, wherein the second error thermal parameter is a temperature variation between a target temperature and an actual temperature of the CPU or a temperature variation between a target temperature and an actual temperature of the GPU in the current loop.

20. The thermal control method of claim 19, wherein the first actual thermal parameter is an actual temperature of the battery or an actual temperature of the electronic device case in a current loop, and the second actual thermal parameter is an actual temperature of the CPU or an actual temperature of the GPU in the current loop.

* * * * *